(12) United States Patent
Richards et al.

(10) Patent No.: US 12,340,354 B2
(45) Date of Patent: *Jun. 24, 2025

(54) FINANCIAL TERMINAL THAT AUTOMATICALLY RECONFIGURES INTO DIFFERENT FINANCIAL PROCESSING TERMINAL TYPES

(71) Applicant: Everi Payments Inc., Austin, TX (US)

(72) Inventors: Timothy Richards, Las Vegas, NV (US); Dale Baltzell, Bixby, OK (US); Brian T. Sullivan, Las Vegas, NV (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,125

(22) Filed: Feb. 5, 2024

(65) Prior Publication Data
US 2024/0242190 A1    Jul. 18, 2024

Related U.S. Application Data

(63) Continuation of application No. 18/107,333, filed on Feb. 8, 2023, now Pat. No. 11,900,345, which is a (Continued)

(51) Int. Cl.
*G06Q 40/00*    (2023.01)
*G06Q 20/10*    (2012.01)
(Continued)

(52) U.S. Cl.
CPC ....... *G06Q 20/1085* (2013.01); *G06Q 20/341* (2013.01); *G06Q 20/356* (2013.01);
(Continued)

(58) Field of Classification Search
CPC ............ G06Q 20/1085; G06Q 20/341; G06Q 20/356; G06Q 20/3567; G06Q 20/4012; G06Q 20/42; G07F 19/21; G07F 19/211
(Continued)

(56) References Cited

U.S. PATENT DOCUMENTS 3,959,028 A    5/1976    Jackson
4,660,168 A    4/1987    Grant et al.
(Continued)

OTHER PUBLICATIONS

Contactless payment systems based on RFID technology; The 33rd International Convention MIPRO (pp. 1114-1119); Lacmanović, I., Radulović, B., Lacmanović, D., May 24, 2010. (Year: 2010).*
(Continued)

*Primary Examiner* — Tien C Nguyen
(74) *Attorney, Agent, or Firm* — Snell & Wilmer LLP

(57) ABSTRACT

An improved financial terminal automatically reconfigures into different financial processing terminal types. In one embodiment, the terminal comprises a housing; a card reader configured to accept at least a portion of a card having an integrated circuit; at least one display; at least one processor; and at least one memory configured to store machine readable code, the machine readable code comprising a first kernel corresponding to a first transaction type and a second kernel corresponding to a second transaction type.

18 Claims, 7 Drawing Sheets

Related U.S. Application Data continuation of application No. 17/153,722, filed on Jan. 20, 2021, now Pat. No. 11,580,510, which is a continuation of application No. 16/688,609, filed on Nov. 19, 2019, now Pat. No. 10,902,392, which is a continuation of application No. 15/892,543, filed on Feb. 9, 2018, now Pat. No. 10,496,968, which is a continuation of application No. PCT/US2016/053205, filed on Sep. 22, 2016, which is a continuation-in-part of application No. 15/047,198, filed on Feb. 18, 2016, now Pat. No. 10,068,210.

(60) Provisional application No. 62/233,089, filed on Sep. 25, 2015.

(51) Int. Cl.
    *G06Q 20/34*      (2012.01)
    *G06Q 20/40*      (2012.01)
    *G06Q 20/42*      (2012.01)
    *G07F 19/00*      (2006.01)

(52) U.S. Cl.
CPC ..... *G06Q 20/3567* (2013.01); *G06Q 20/4012* (2013.01); *G06Q 20/42* (2013.01); *G07F 19/21* (2013.01); *G07F 19/211* (2013.01)

(58) Field of Classification Search
USPC ........ 705/43, 39, 37, 38; 709/226, 201, 227, 709/246; 704/9; 701/425; 455/406; 715/753, 700; 726/9, 6, 25, 2; 706/25, 706/45, 46
See application file for complete search history.

(56) References Cited

U.S. PATENT DOCUMENTS

| | | | | |
|---|---|---|---|---|
| 5,577,121 | A * | 11/1996 | Davis | H04L 9/3247 705/68 |
| 6,003,014 | A * | 12/1999 | Lee | G06Q 20/367 705/13 |
| 6,023,688 | A * | 2/2000 | Ramachandran | G06Q 20/1085 705/40 |
| 6,081,792 | A * | 6/2000 | Cucinotta | G06Q 20/403 235/379 |
| 6,296,182 | B1 * | 10/2001 | Ota | G07F 7/04 235/492 |
| 6,554,185 | B1 * | 4/2003 | Montross | G07F 19/20 902/8 |
| 7,080,782 | B2 * | 7/2006 | Charrin | G06K 7/0004 235/492 |
| 7,152,783 | B2 * | 12/2006 | Charrin | G06Q 20/367 235/440 |
| 7,174,322 | B2 * | 2/2007 | Kosuda | G06Q 20/4012 705/72 |
| 7,188,761 | B2 * | 3/2007 | Ito | G06K 7/10336 235/379 |
| 7,600,673 | B2 | 10/2009 | Stoutenburg et al. | |
| 8,631,093 | B2 * | 1/2014 | Defosse | G07F 9/026 713/168 |
| 8,959,028 | B2 * | 2/2015 | Canter | H04L 67/02 705/16 |
| 9,195,930 | B2 * | 11/2015 | Bertin | G06K 19/07743 |
| 9,251,513 | B2 | 2/2016 | Nilsson et al. | |
| 9,384,477 | B2 | 7/2016 | Johnson et al. | |
| 10,496,968 | B2 | 12/2019 | Richards et al. | |
| 2002/0052843 | A1 | 5/2002 | Canon | |
| 2003/0033251 | A1 * | 2/2003 | Sherlock | G06Q 20/407 705/43 |
| 2004/0230535 | A1 * | 11/2004 | Binder | G06Q 20/24 705/64 |
| 2005/0029340 | A1 * | 2/2005 | Ferraro | G07F 19/205 235/379 |
| 2007/0125866 | A1 * | 6/2007 | Nishizawa | G06K 19/07732 235/492 |
| 2008/0203172 | A1 * | 8/2008 | Berardi | G06K 19/0723 235/492 |
| 2008/0243524 | A1 * | 10/2008 | Agrawal | G06Q 10/10 705/1.1 |
| 2010/0223184 | A1 | 9/2010 | Perlman | |
| 2011/0068921 | A1 * | 3/2011 | Shafer | G08B 13/2462 340/571 |
| 2013/0218697 | A1 | 8/2013 | Kingston et al. | |
| 2013/0332349 | A1 * | 12/2013 | Dent | G06Q 20/18 705/40 |
| 2014/0081857 | A1 * | 3/2014 | Bonalle | G06Q 20/382 705/41 |
| 2014/0143078 | A1 * | 5/2014 | Meehan | G06Q 20/204 705/21 |
| 2014/0372300 | A1 * | 12/2014 | Blythe | G06Q 20/3676 705/41 |
| 2014/0372320 | A1 * | 12/2014 | Goldfarb | G07F 7/1033 705/72 |
| 2016/0020906 | A1 | 1/2016 | Nolte et al. | |

OTHER PUBLICATIONS

On designing a flexible e-payment system with fraud detection capability; Proceedings. IEEE International Conference on e-Commerce Technology, 2004. CEC 2004. (pp. 236-243); A. Leung, Zhuang Yan, S. Fong; Jan. 1, 2004. (Year: 2004).*

EMV—Wikipedia, the free encyclopedia, "https://en.wikipedia.org/w/index.php?title=EMV&oldid=721927186", May 24, 2016, 20 pages.

International Search Report and Written Opinion for International Application No. PCT/US2016/053205 mailed Dec. 9, 2016. 13 pages.

Office Action issued by the Canadian Intellectual Property Office for Application No. 3,025,541, mailed Sep. 8, 2020, 6 pages.

Implementation of smart card personalization software; 2011 International Conference on Multimedia Computing and Systems (pp. 1-7); Mammass, H.; Apr. 7, 2011. (Year: 2011).

Design of secure Smart card reader and Wi-Fi interface for Point of Sale terminal; 2018 3rd IEEE International Conference on Recent Trends in Electronics, Information & Communication Technology (RTEICT) (pp. 1341-1345); V Sahana, H K E Latha, Raju Bhandari, May 18, 2018. (Year 2018).

Development of an Intelligent Module for Monitoring and Analysis of Client's Bank Transactions; 2019 24th Conference of Open Innovations Association (FRUCT) (pp. 255-262); Vasily Meltsov; Pavel Novokshonov; Dmitry Repkin; Alexander Nechaev; Nataly Zhukova; Apr. 8, 2019. (Year 2019).

An Investigation into credit card information disclosure through Point of Sale purchases; 2015 Information Security for South Africa (ISSA) (pp. 1-8); S. von Solms; Aug. 1, 2015. (Year: 2015).

* cited by examiner

FINANCIAL TERMINAL THAT AUTOMATICALLY RECONFIGURES INTO DIFFERENT FINANCIAL PROCESSING TERMINAL TYPES

RELATED APPLICATION DATA

This application is a continuation of U.S. application Ser. No. 18/107,333, filed Feb. 8, 2023, which is a continuation of U.S. application Ser. No. 17/153,722, filed Jan. 20, 2021, now U.S. Pat. No. 11,580,510, which is a continuation of U.S. application Ser. No. 16/688,609, filed Nov. 19, 2019, now U.S. Pat. No. 10,902,392, which is a continuation of U.S. application Ser. No. 15/892,543, filed Feb. 9, 2018, now U.S. Pat. No. 10,496,968, which is a continuation of PCT Application PCT/US2016/053205, filed Sep. 22, 2016, which is a continuation-in-part of U.S. patent application Ser. No. 15/047,198, filed Feb. 18, 2016, now U.S. Pat. No. 10,068,210, which claims priority to U.S. Provisional Application Ser. No. 62/233,089, filed Sep. 25, 2015. The present application claims priority to each of said prior applications and incorporates by reference each of said applications as if set forth fully herein.

FIELD OF THE INVENTION

The present invention relates to devices which are used to facilitate the processing of financial transactions.

BACKGROUND OF THE INVENTION

Magnetic strip debit and credit cards have long been the technology of choice for debit and credit transactions. As the use of debit cards and credit cards have grown throughout the world, criminals have worked harder to steal them. Further compounding the problem has been large-scale data breaches and increasing rates of counterfeit card fraud. Nearly 40 percent of credit and debit card fraud involves stolen account numbers that are used to create counterfeit cards and 20 to 30 percent of fraud involves "card-not-present" fraud, wherein account numbers are used for transactions online or by phone.

If a thief obtains an account-holder's account number and the three- or four-digit security code printed on the chip card, the thief can use that account-holder's account information for transactions online or by phone. Or if the account-holder loses their credit or debit card that contains a chip, there's nothing that prevents a thief from using the account-holder's card in a store. Current estimates are 30 to 40 percent of fraud involved lost or stolen cards, or claims of fraud that actually involve the account owner.

A new debit and credit card technology referred to as an integrated circuit card (referred to herein as an "IC" card") has been adopted by the industry to improve payment security and to make it more difficult for fraudsters to successfully counterfeit cards. Such cards include an integrated circuit on the card. One such card having a particular standard is managed by EMVCo, and thus these types of cards are commonly referred to as EMV cards. The Smart Card Alliance estimates that by the end of 2015 600 million account-holders will be using an IC card.

As the industry moves away from magnetic strip cards, retailers such as casinos are looking for new ways to offer more services using IC technology.

One key feature of an IC card relates to how the card chip creates a unique transaction code for each consumer action at a terminal (cash withdraw, cash advance, Point of Sale (POS)). A transaction cannot be used more than once. If a thief stole the chip information from one specific point of sale, card duplication would not work since the stolen transaction number created for a given transaction wouldn't be usable again and the transaction would just get denied.

However, the configuration of such integrated circuit cards is limiting to the user of the card, such as in successfully processing a request for funds.

SUMMARY OF THE INVENTION

One aspect of the invention is an improved financial terminal that automatically reconfigures into different financial processing terminal types. In one embodiment, the terminal comprises a housing; a card reader configured to accept at least a portion of a card having an integrated circuit; at least one display; at least one processor; and at least one memory configured to store machine readable code, the machine readable code comprising a first kernel corresponding to a first transaction type and a second kernel corresponding to a second transaction type.

In one embodiment, the machine readable code is further configured, when executed by the at least one processor, to determine available financial transaction types associated with the card which is accepted by the card reader, to configure the financial terminal to a first configuration by utilizing the first kernel to process a first financial transaction, and when the first financial transaction is denied, to automatically reconfigure the financial terminal to a second configuration by utilizing the second kernel to process a second financial transaction.

The improved financial terminal may further comprise a monetary dispensing device, such as a currency dispenser.

In one embodiment, the improved financial terminal further comprises a communication interface configured to transmit information to and receive information from at least one financial processing network. The machine readable code may be further configured to send, via the communication interface, a request to process the first financial transaction as a transaction of the first transaction type and send a request to process the second financial transaction as a transaction of the second transaction type.

In one embodiment of the invention, the first transaction type is a Personal Identification Number ("PIN") based transaction type and the second transaction type is a Signature based transaction type.

The improved financial terminal may be configured so that the card is not ejected from the card reader when the first financial transaction is denied. In addition, the terminal may be configured so that the card is automatically re-read by the card reader after the first financial transaction is denied.

In one embodiment, the improved financial terminal is configured into the first configuration based upon receipt of user input, such as a selected financial transaction type.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Aspects of the invention comprise methods, systems and apparatuses for facilitating and/or processing financial transactions, such as to access funds from a financial account. One aspect of the invention is an improved financial terminal.

The invention has particular utility to integrated circuit ("IC") card based transactions, e.g. a card or other media which is preferably associated with one or more financial accounts and which utilizes an associated integrated circuit as part of a financial transaction information read/write verification procedure, such as those cards which comply with the EMV card standard managed by EMVCo. It will be appreciated that such a card may be associated with one or more sources of funds. Such sources of funds may comprise, for example, a checking or savings account associated with a financial institution such as a bank or credit union. However, the card might be associated with or provide access to other sources of funds now or later developed, such as sources of credit, electronic wallets, investment accounts and so forth.

Figure 1A:
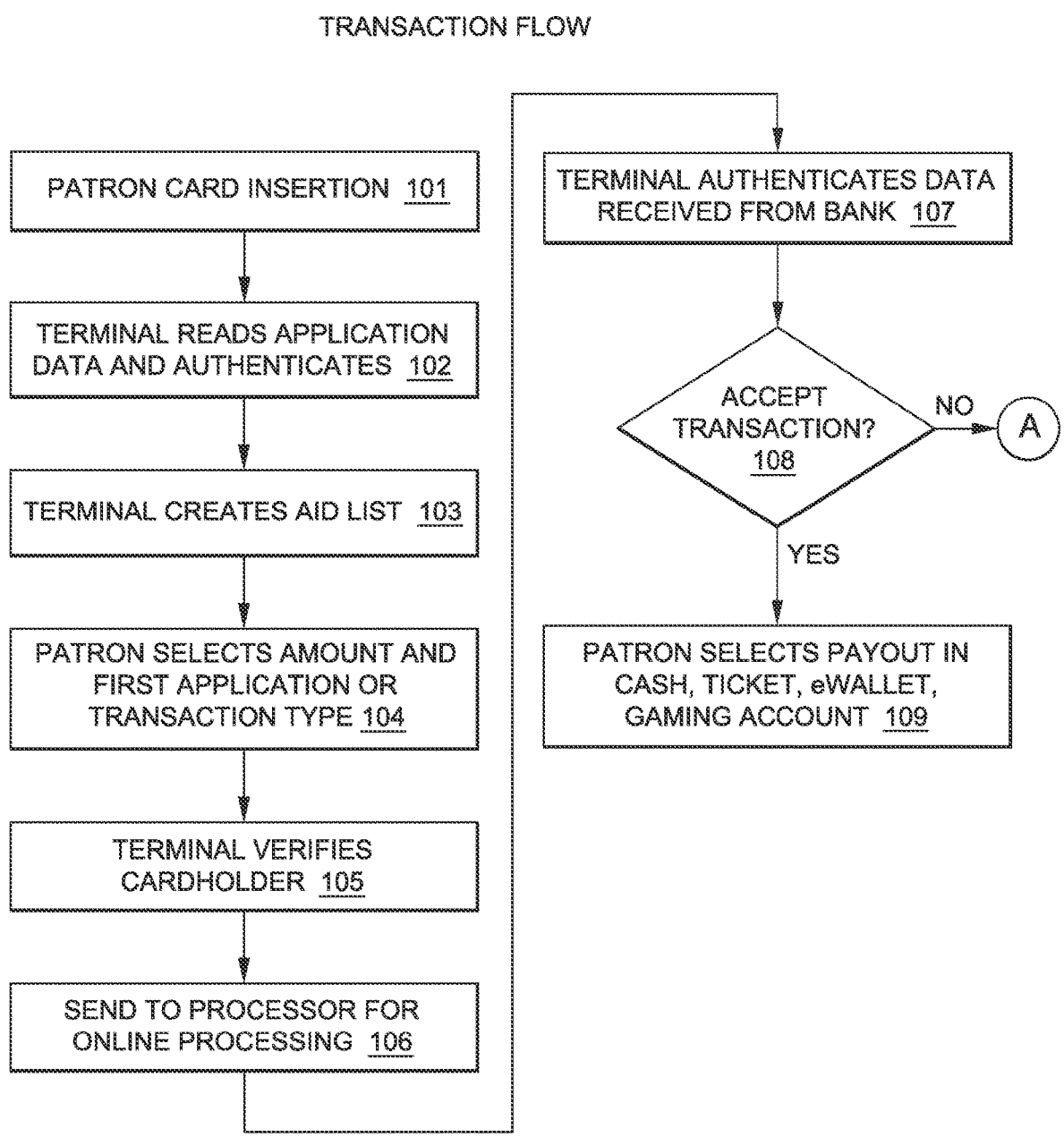
FIGS. 1A and 1B are flow diagrams illustrating a method in accordance with one embodiment of the invention.
Figure 1B:
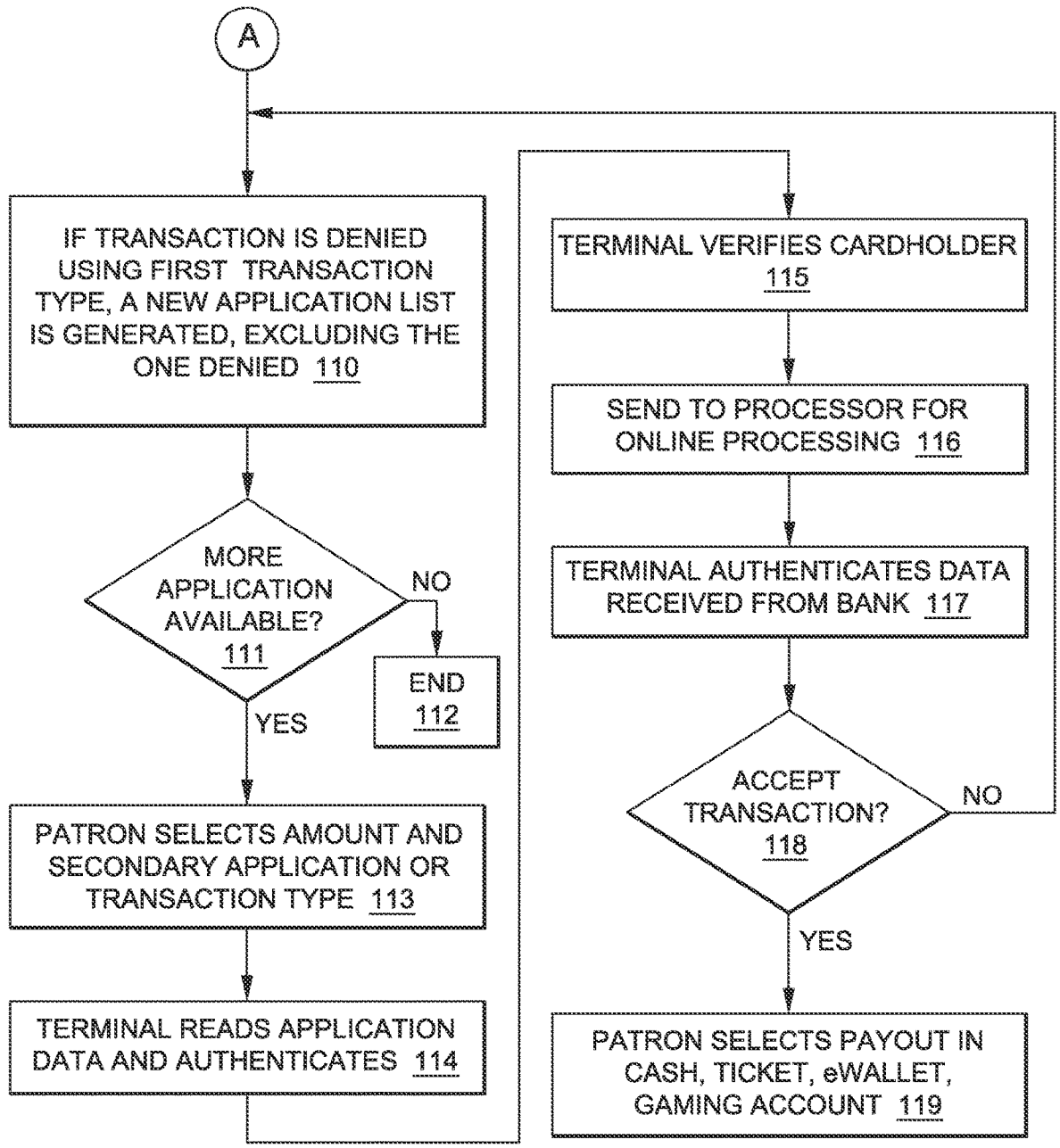
Figure 3:
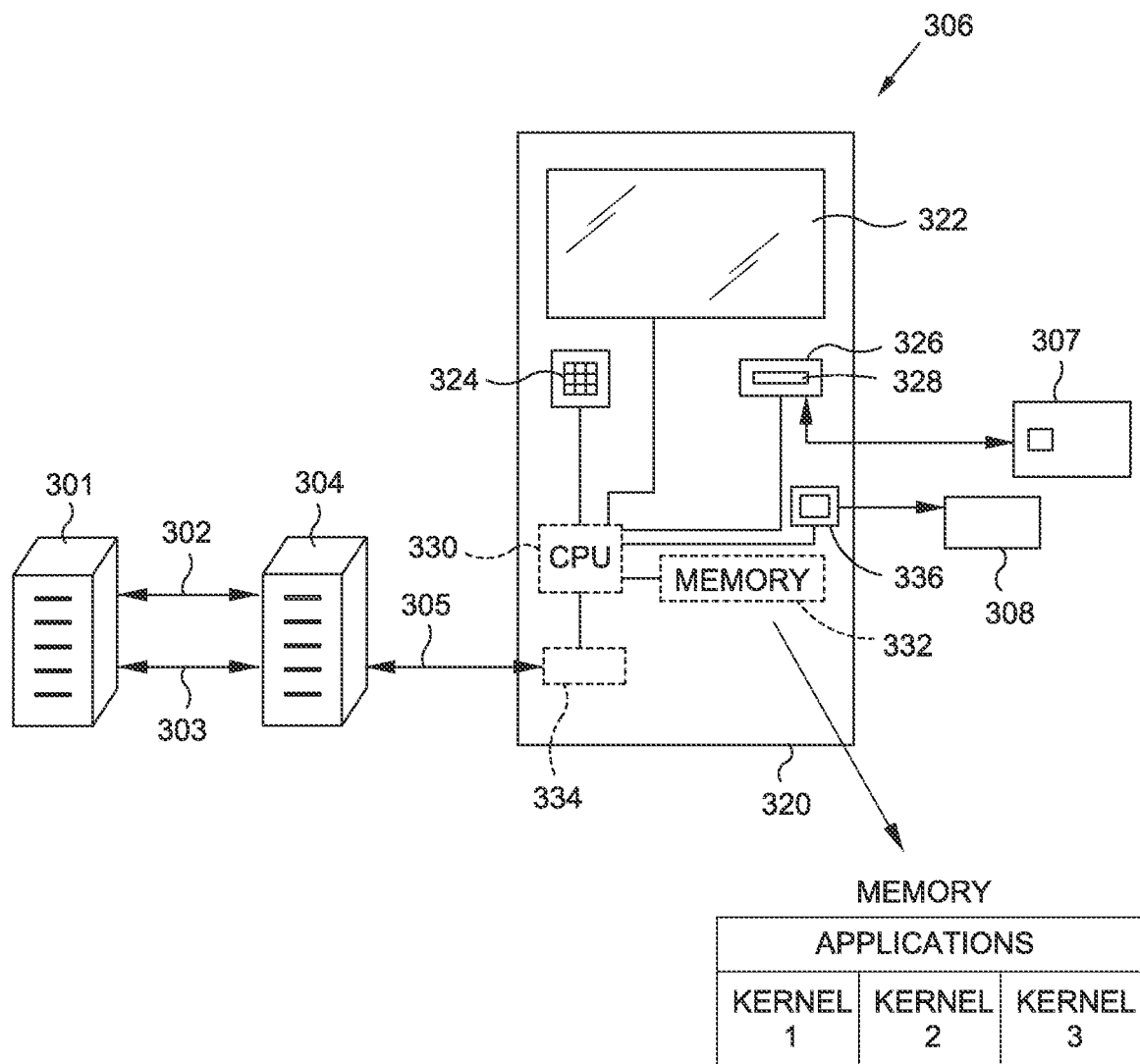
FIG. 3 illustrates a system in accordance with one embodiment of the invention.

FIGS. 1A and 1B are flow diagrams which illustrate one embodiment of a transaction flow of the present invention. FIG. 3 illustrates one embodiment of a system in accordance with the invention. A first embodiment of the invention will be described with reference to FIGS. 1A and 1B and FIG. 3.

In step 101, an account-holder or user presents an IC card 307 to a processing or transaction terminal 306 in order to receive or access funds. As described herein, the funds may be issued or provided to the account-holder in various forms, such as in the form of coins, currency or equivalent, casino ticket of value, electronic funds transfer such as to a vendor, an e-wallet, a casino account, or by other value instrument, including where the instrument can be used directly or indirectly as funds to purchase items of value such as casino game credits, merchandise, food, rooms, etc.

In one embodiment, such as illustrated in FIG. 3, the terminal 306 comprises an improved financial terminal. The terminal 306 may have different sizes, shapes and configurations (including counter-top units, stand-up units, etc.). As one example, the terminal 306 may include a housing 320, one or more user interfaces and input devices, such as one or more electronic video displays 322, a keypad/buttons 324, touch screen, or the like. The terminal preferably also includes a media reader 326. In the case of an IC card, the reader 326 preferably comprises a card slot 328 which is configured to accept at least a portion of the card and which includes an associated chip reader, e.g. a device which is configured to engage/read information associated with the integrated circuit of the card (and preferably also write or transmit information to the integrated circuit). The terminal 306 may be configured with at least one dispenser 336 to dispense money or monetary value, such as coins and/or currency, other media such as tickets or the like. The terminal 306 preferably includes one or more processors 330, one or more memory or data storage devices 332 (such as for storing machine-executable code or "software"), and one or more communication interfaces 334 for transmitting and/or receiving data from other devices, such as to one or more financial processing networks, remote financial institutions or the like.

In one embodiment, the terminal 306 is configured, such as via hardware (e.g. a specially configured processor) and/or software (e.g. machine readable code which is stored the memory associated with the processor and which is executable by the processor), to perform the functionality indicated herein. For example, as described in more detail below, the software may be configured to cause the reader to read information from the card and present different transaction types to the account-holder via a display of the terminal, receive a selected transaction type from the account-holder, generate information regarding the selection (such as a request for processing of a requested monetary amount from an identified account), transmit the information to a financial processing network, accept information regarding the request (such as an approval or denial received back from the financial processing network), to dispense funds (if the transaction is approved), to re-read the card if the first transaction is denied to and to generate a new list of available transaction types (which list preferably does not include the first selected transaction type), to receive input of a second selected transaction type, etc., as detailed herein.

In one embodiment of the invention, the terminal 306 includes or enables two or more different kernels or nuclei. These kernels (comprising machine-readable program code) are stored in the one or more memory devices 332 of the terminal 306. For example, the terminal 306 may include a memory 332 which stores one or more software applications and which also includes a segregated or protected area which stores the two or more kernels.

In one embodiment, one or more kernels are provided which correspond to different transaction types. For example, a first kernel may be provided corresponding to PIN based transaction types and another kernel may be provided corresponding to signature based transaction types. In other embodiments, kernels may even be provided corresponding to more detailed transaction types, such as one for PIN based debit transactions and one for PIN based ATM transactions.

In accordance with the invention, when a particular transaction type is selected (by an account-holder or automatically), the corresponding kernel to that transaction type is selected and utilized. This essentially causes the terminal 306 to be configured into a terminal which has a specific configuration for performing that particular transaction type. For example, if the first transaction is an ATM type transaction, the corresponding kernel is selected and the terminal 306 is thus effectively configured as an ATM machine. On the other hand, if a signature based transaction were selected, that corresponding kernel is selected, thus effectively causing the terminal to be configured as a POS type device. This aspect of the invention is particularly advantageous because the different kernels cause the terminal 306 to be particular configured (including by way of the particular applications which are selected by the corresponding kernel and the control over the associated terminal peripheral and other devices) to enable the particular transaction which has been selected, including because the terminal 306 is then configured to communicate with external devices and financial systems in a manner which enables the terminal 306 to interfaces with those systems for requesting/performing the particular transaction type).

In one embodiment, the card 307 is inserted into a card reader slot of the terminal 306 (such as face-up into the slot, chip end first, or such other orientation as is required by the terminal/reader).

When terminal 306 detects that the card 307 has been presented, such as by being inserted into the terminal's card slot, the terminal reads the card. Preferably, the terminal 306 engages mechanical card components with the card to make physical contact with the card 307 to read the contents of the card via provided IC card interface functions, and to authenticate the card. As indicated herein, the authentication step may optionally prompt the account-holder for a pin, password, or other means of authentication or wait until step 104 to determine the required type of account-holder authentication for the account-holder selected transaction.

The card 307 preferably contains a list of Application Identifiers (AIDs) of every IC application or transaction type that the card 307 is configured to support (directly or via information which can be used to determine such AIDs). In step 103, the terminal 306 generates or obtains a candidate list of applications that are supported by both the terminal 306 and the card 307 (the list might be generated in various ways, such as by direct interrogation, using a look-up table, remote validation, etc.).

Once a list of supported applications is built or obtained by terminal 306, the terminal is configured to cause an associated video display to display the list and information (such as text and/or graphics, such as in the form of a graphical user interface) to prompt the account-holder to select the desired type of transaction and the desired amount of the transaction.

In step 104, the account-holder provides input to the terminal 306, such as via touching the touchscreen or keypad of the terminal, to choose the desired application or transaction type. Possible transactions for a particular account-holder may be one or more of the following: a PIN-based transaction, a signature-based transaction, or other types of transactions now known or later developed.

When the account-holder selects a PIN-based transaction (which in conjunction with the use of an IC card may be referred to as a chip-and-PIN type transaction), the account-holder inputs such information, such by using the terminal's touchscreen or keypad to enter a sequence of numbers. If the transaction requires a signature (which may be referred to as a chip-and-signature or signature-based transaction), then as described below, the terminal 306 might be configured to collect the signature or perform other authentication or verification (such as by collecting identification information; such collection might be performed via interaction with a remote agent via the terminal or by direct implementation by the terminal), or this authentication might be performed remotely, such as by requiring the account-holder to physically go to a casino cage or to some other location where a signature (physical, digital or other type as meets the requirements for the transaction) can be collected by a cashier or other appropriate personnel (and which authentication may also require collection of secondary physical identification, such as from or via an identification card such as a state or federally issued identification card). Of course, the account-holder may not be required to perform the authentication steps unless the transaction is approved.

In this regard, one aspect of the invention is a unique two-part signature based transaction. In particular, in accordance with the present invention, the account-holder's request for funds using a signature based transaction may initially be performed at the terminal 306 by obtaining an approval of the request for funds. The account-holder may be provided with a receipt or other confirmation of the approval and may travel to a cashier (or other location where a physical attendant exists), where upon the cashier may confirm the identity of the account-holder and collect the account-holder's signature, thus completing the second part of the transaction at a second location other than the terminal 306.

If there is only one application or transaction type supported by the card, such as a PIN-based transaction, that transaction is preferably automatically be selected without prompting the account-holder to select the application.

Once the application has been selected, the requested financial transaction is initiated in accordance with the selected transaction type. As described herein, this may entail use of different information and/or networks for attempting to process the financial transaction. In one embodiment, the terminal 306 provides the card 307 with data that it requests in a Processing Options Data Object List (PDOL). The PDOL is a list of data from the terminal 306 that is required by the card at the beginning of a Read Application Data (RAD) stage. The terminal 306 may use a Direct Object List (DOL), a list containing one or more pairs of tags and lengths but not values, and the associated processing rules, to format the requested data and to obtain transaction processing options. The terminal 306 then sends the data to the card 307 in a Get Processing Options (GPO) request prompting the card to supply the Application File Locator (AFL) to the terminal. The AFL is used by terminal 306 to read the application data records from the card 307 comprising tags of information used for transaction processing including cardholder verification and card authentication.

In step 105, cardholder verification checks that the person using the card 307 is the cardholder. The card 307 contains a list of verification methods that it supports, and the conditions under which they should be applied. The terminal 306 preferably automatically navigates through the list and attempts the first method it finds for which the condition is met. For example, a list might contain a list of two items: online PIN (if unattended cash) and signature (always). If a method fails, the terminal 306 checks if additional methods are allowed. Then the card and/or terminal analyzes the results of all previous steps and determines: 1) to seek online authorization of the transaction, or 2) to complete it offline at a secondary location after a signature is collected, or 3) to decline the transaction.

In step 106, the transaction or request for monetary value is preferably transmitted from the terminal to one or more remote systems or devices for processing. In one embodiment, the transaction request is sent from the terminal 306 via a communication link 305 to a remote processor 304. The remote processor 304 might be implemented by a computing device, such as a server, such as having one or more processors executing software, a communication interface and the like. The processor 304 determines the type of transaction and routes the transaction request to an appropriate financial processing network and/or device, which network and/or device might vary depending upon the transaction type. For example, the processor 304 might either route the transaction to a POS network 302 or to a financial processing network 303 (or other relevant network or system), then on to the card issuer bank 301 (or other financial institution, system or entity with which the account-holder's financial account is associated). In another embodiment, the terminal 306 may directly route the transaction or request to the financial processing network.

The bank 301 (such as via a computing device or computing system associated with the bank, either automatically and/or via user input) analyzes the transaction details and decides to authorize or reject the transaction request. For example, the bank 301 may check the account status and apply criteria based upon acceptable limits of risk defined by the bank 301, the payment scheme and the acquirer. If no valid response is received from the processor 304 due to communications failure, then the terminal 306 performs additional Terminal Action Analysis, the results of which will determine whether the transaction is accepted or declined.

Whether the transaction has been approved or denied by the bank 301, a response (such as an approval or denial) is sent back to terminal 306 (or if no response is received, such as a result of a communication time-out, then the terminal 306 may default to a "denial" status). In step 107, terminal 306 receives the transaction response and authenticates it.

If in step 108 the requested transaction has been accepted or approved, in step 109 the terminal 306 delivers or provides access to the requested funds (such as by issuing coins, currency, tickets and/or via electronic transfer, etc.). Alternatively, the terminal 306 may provide the account-holder with a list of options with regards to how funds are to be delivered. This may include, but is not limited to: cash, casino ticket, and/or funds transfer (such as to an e-wallet, a gaming or casino account, another account, a vendor account, etc.). Where a signature is required, additional authentication steps may be performed at the terminal 306 or remotely. For example, in one embodiment, the terminal 306 may prompt the account-holder to complete the transaction at a secondary location such as a casino cage where a signature may be collected, identification may be verified, etc. In another example, the authentication may be performed at the terminal 306, such as via a remotely interfaced agent or directly via the terminal (such as by input of a signature to the terminal, providing identification to the terminal—such as presenting/reading an identification card, etc.).

If the first transaction was denied, then in a step 110, if other applications or transaction types are available, a second application or transaction type is preferably automatically (e.g. without account-holder input or prompting) generated and presented (such as via a displayed menu or list of remaining transaction types). If more applications or transaction types remain available (e.g. are supported and were not previously selected and processed as above), then in step 111, the account-holder will be prompted in step 113 to choose the second application or transaction processing type to generate a second funds request transaction. If no additional applications are available, then the process ends at step 112 as a result of the funds denial (at which point the account-holder may be prompted to remove their card from the terminal 306). For example, if the card 306 supports both PIN and signature based transaction types and the first selected transaction type was a PIN transaction, then the account-holder may be presented with the option to perform a second transaction attempt using a signature based transaction type (of course, if a different transaction type was selected as the first transaction type, such as a signature based transaction type, and this first transaction type was denied, then in step 110 a new list of remaining application types which exclude the signature based transaction type would be generated).

In step 114, the terminal 306 rereads the card 307 and re-authenticates, then creates new application list (e.g. creates a list of supported application or transaction types, excluding the initial failed/rejected transaction(s), such as an initial PIN-based transaction). In one embodiment, the available transaction types may be determined by interrogating the card for supported transaction types, though other means may be used to determine the available transaction types. The cardholder is authenticated (step 115) and the transaction is initiated via the second transaction type (such as using the appropriate protocol and network(s), such as by sending the second requested transaction to processor and on to bank (step 116). In step 117 the terminal 306 receives the response transaction. If the transaction was authorized, the terminal 306 either delivers funds to the account-holder or prompts the account-holder with a list of options regarding how funds may be delivered. This may again include dispensing of cash or a casino ticket, funds transfer to an e-wallet, funds transfer to a gaming account, etc. Where a signature is required, the terminal 306 prompts the account-holder to complete the transaction, such as at the terminal or remotely at a secondary location as described above.

If the transaction is denied, the terminal 306 builds a new application or transaction type list with those applications/transaction types that are supported and were not previously denied, and the process returns to step 110. This continues until either the transaction has been accepted, the account-holder elects to discontinue the transaction, or until there are no more applications for the account-holder to use to access funds, wherein the account-holder is denied.

Once the desired transaction is completed, no further transaction types are available or are selected by the account-holder, then the card 307 may be removed from the terminal 306. In this regard, it will be appreciated that a card "session" may be referred to as the period between when the card 307 is inserted and when it is removed. During a single session, as described herein, multiple transactions may be performed or may be attempted while the card remains engaged with the reader (as indicated herein, one important aspect of the invention is that the terminal is configured to present and process multiple transaction types without the account-holder having to remove and re-insert their card between an attempted first transaction type and a second (or subsequent) attempted transaction type). In one embodiment, the account-holder may be prompted to remove their card, such as via a prompt which is displayed on a display of the terminal: a) after successful completion of a financial transaction via the first transaction type; b) after the account-holder declines to attempt a second (or subsequent) transaction type when the processing via the first transaction type was unsuccessful; and c) after successful completion of the financial transaction via a second (or subsequent) transaction type. An account-holder might also be prompted to maintain the card in its inserted position after a financial transaction is unsuccessful via a first transaction type to ensure that the terminal can re-read the card and prepare the new list. Aside from information displayed on a display, such prompts might include lights (such as a RED light to indicate the card should not be removed and a GREEN light when the account-holder should remove the card).

Figure 4A:
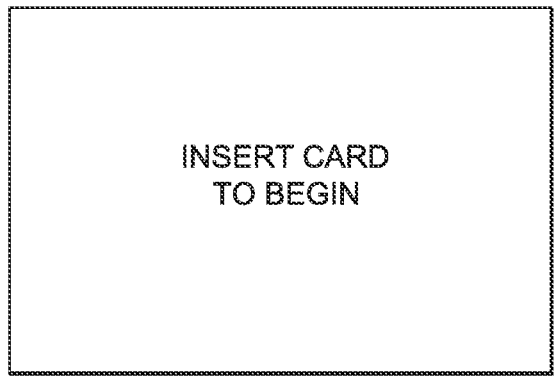
FIGS. 4A-4I are screen shots in accordance with one embodiment of the invention.

One example of the present invention will be described with reference to FIGS. 4A-4I. These figures illustrate exemplary screen shots, such as which might be displayed by a screen 322 of a terminal 306 such as that illustrated in FIG. 3. As illustrated in FIG. 4A, an account-holder might be instructed to insert their card 307 into a card reader of the kiosk or terminal 306 to begin a transaction. In the preferred embodiment, once the account-holder inserts their card, they may be instructed to leave the card inserted for the duration of the transaction in order to facilitate the method of the invention.

Figure 4B:
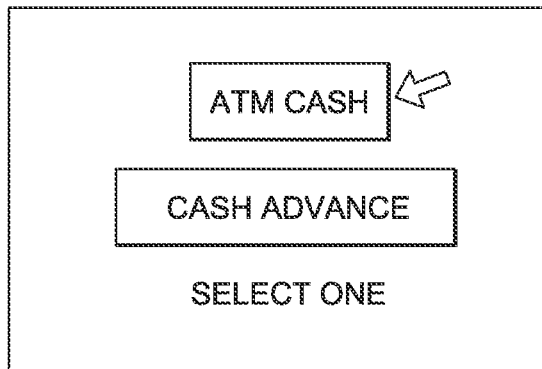
Figure 4C:
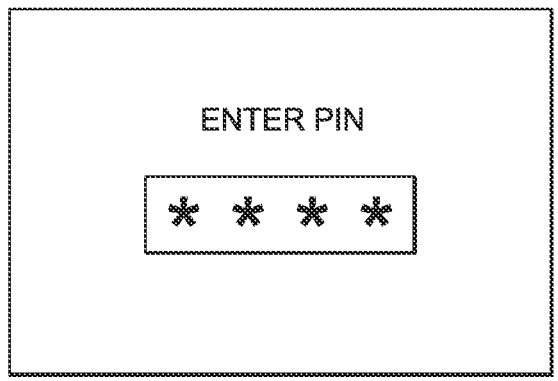
Figure 4D:
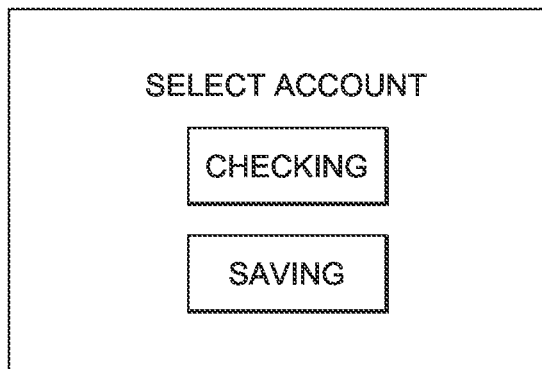

As illustrated in FIG. 4B, once an account-holder has inserted their card 307, they may be presented with different options for accessing funds, such as via an ATM (chip and PIN) type transaction or a Cash Advance (chip and signature) type transaction (wherein the offered transaction types may be determined by an interrogation of the account-holder's card for the different types of supported transactions). One or more of the available transaction options may be displayed to the account-holder. In this example, the account-holder has selected "ATM Cash." In response, as illustrated in FIG. 4C, the account-holder may be instructed to enter their PIN, such as via a keypad of the terminal 306. Upon entry of the correct PIN for their account, the account-holder may be presented with the option of selecting a desired account from which to access funds (such as if multiple accounts are associated with the account-holder's card 307). For example, as illustrated in FIG. 4D, an account-holder might be presented with the option to access funds from their checking or savings account.

Figure 4E:
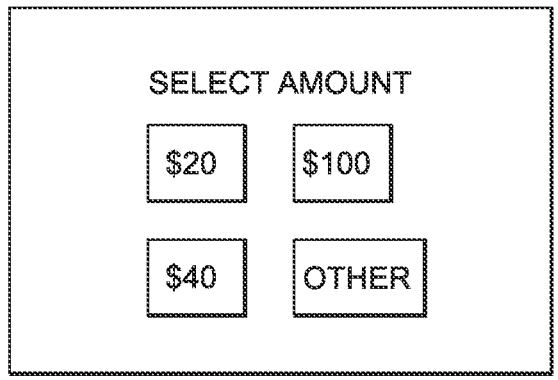

As illustrated in FIG. 4E, upon selecting a desired account, the account-holder may be provided with the option of selecting a desired transaction amount. This information might be presented in various manners, such as by presenting the account-holder with the option to select a particular pre-designated amount (such as $20, $40, etc.) or by inputting a desired amount.

Figure 4F:
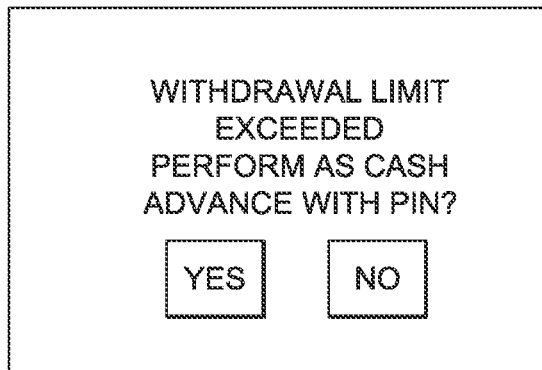
Figure 4G:
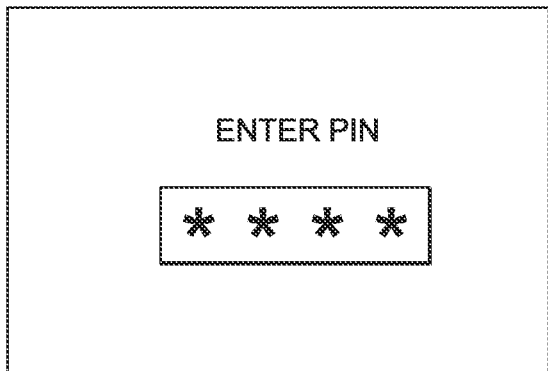

In this example, the account-holder has selected or input a desired amount, but the desired amount has been determined to exceed the withdrawal limit for the account (such as based upon a maximum daily withdrawal limit). Most importantly, as illustrated in FIG. 4F, the account-holder has been so notified and has automatically been presented with the option of seeking funds via a different transaction type. In accordance with the present invention, as described above, the account-holder's card preferably remains inserted or engaged during this process. The account-holder's card may have been interrogated to determine that the card also supports funds access via a cash advance type transaction (either initially or after rejection of the first transaction). As a result, this type of transaction has been offered to the account-holder as an alternative means of accessing funds.

Figure 4H:
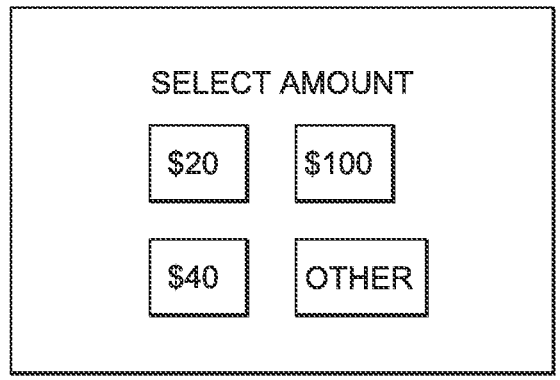
Figure 4I:
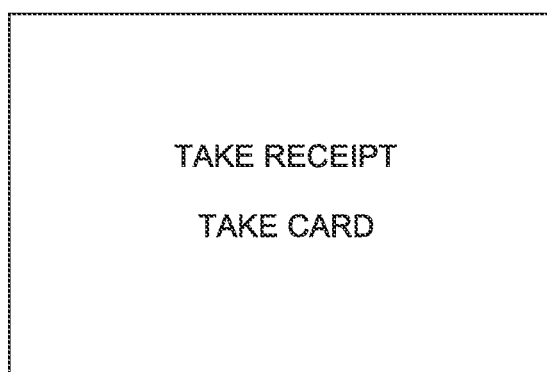

In this example, the account-holder has selected the option of accessing funds via a cash advance and has, as illustrated in FIG. 4G, again been asked to provide their PIN. As illustrated in FIG. 4H, once the PIN has been input and verified, the account-holder may again be presented with the option of selecting a desired transaction amount. In this example, the account-holder has selected or input a desired amount and the amount has been approved. In one embodiment, a receipt has been issued by the terminal 306 representing the transaction. As illustrated in FIG. 4I, the account-holder may be instructed to now remove their card 307 (e.g. the account-holder only now removes their card after the completion of the transaction after the initial transaction was rejected, the secondary transaction was offered and completed) and to take their receipt. The receipt may provide evidence of the transaction and may instruct the account-holder to go to a cashier or other location to obtain their funds. When the account-holder goes to the cashier, they may provide their receipt to the cashier and may be provided the requested funds, such as upon secondary authentication (such as by providing a signature).

Of course, FIGS. 4A-4I are just one example of screen shots of information which may be presented to an account-holder of a terminal based upon a transaction which is implemented in accordance with the present invention. Other information might be displayed to the account-holder or the information might be displayed in other manners. Further, different information would be displayed based upon other types of available transactions, user inputs/selections and the like.

In the embodiment described above, when the terminal 306 first reads the account-holder's card, the terminal creates an AID list and the present all available transaction types to the account-holder, and if a first transaction type is denied, later presents all available remaining transaction types to the account-holder. In another embodiment of the invention, however, certain transaction types may be automatically selected at one or more times.

As one example, in an alternate embodiment of the invention and referring again to FIG. 1A, in step 103 the terminal 306 creates an application or AID list. If that list contains a designated transaction type, that transaction type is automatically used as the first transaction type—e.g. a list is not displayed to the account-holder and the account-holder does not select the first transaction type in step 104). For example, cards may include AIDs corresponding to single transaction types and/or global transaction types (as such is known in the industry). In accordance with the invention, if a card includes a global AID, then that transaction type is automatically selected as the first transaction type. For example, a card may include a global AID supporting a PIN based debit transaction. In that event, that transaction type is automatically selected, the account-holder is prompted to input or select the request transaction amount, and the process continues, as at step 106.

In this embodiment, if the card AIDs do not include one of the designated transaction types, then a list of transaction types is still presented to the account-holder and the account-holder makes a selection of a first transaction type, as in step 104. For example, if the designated transaction type is a global transaction type but the card only includes AIDs corresponding to two non-global transaction types, then both of those transaction types may be displayed to the account-holder for selection.

In this configuration, the same process may be applied in the event a first transaction fails. In particular, in that event, the terminal 306 may re-read the card 307 and determine if any designated transaction types remain. If so, that designated transaction type may be automatically selected without user input. For example, a card 307 may have two global AIDs. In the first transaction one of those global transaction types may be automatically selected (without user input or selection). If that transaction fails, the player may be prompted as to whether they wish to engage in another attempted transaction. If so, the terminal 306 may automatically use the second global application type which is supported by the card 307, without the account-holder's input.

Of course, other variations of the invention are possible, including variations which include other or additional steps to those indicated above and illustrated in the figures, which eliminate one or more of those steps, or wherein the steps are performed in other orders. As one example, a terminal 306 may be configured to only allow two transaction attempts to be performed. In such a configuration, the process by which an account-holder may select a third or later transaction type and attempt (as described with reference to step 118 above) may not exist.

Also, a second transaction type might automatically be selected (e.g. without user selection) when a card 307 only supports two different transaction types. As one example, a card 307 might include one global AID and one non-global AID. In that case, the global AID might be automatically selected as the first transaction type. If that transaction is denied, then the remaining second non-global transaction type may automatically be selected and utilized since no others exist.

In one embodiment, the terminal 306 might maintain in a memory thereof information regarding one or more previously selected transaction types. This stored information may be used in the creation of a modified list of remaining available transaction types that may be utilized or selected by the account-holder. For example, the terminal 306 may determine that a card 307 supports transaction types A, B and C. If transaction type A is utilized first, the terminal 306 may store that information, whereby when the terminal 306 later reads the card 307 and presents a list of remaining transaction types, it can exclude transaction type A from that list, knowing that it was already utilized. In another embodiment, the terminal 306 might initially read the card 307 and store the entire list of AIDs or transaction types and then remove each one from the list as it is selected and utilized. In yet another embodiment, the terminal 306 might simply be configured to permit two different transaction types and, by way of the flow of the process, implement each one in succession (without storing information regarding the transaction types and which ones have been utilized). For example, the terminal 306 might be configured to automatically utilize a PIN-based transaction type as the first transaction type. In that event, if the first transaction is denied, the terminal might automatically prompt the account-holder as to whether they wish to proceed using the second transaction type (which may be a signature-based transaction) because that is the only second type of transaction which the terminal 306 is configured to implement (e.g. the terminal 306 doesn't include logic which allows it to create detailed lists of available second transaction types but instead is simply configured to ask if the player wishes to try a designated second transaction type and, if so, see if the card supports that type). If the player so elects, then the terminal 306 may verify that the card supports that transaction type and proceed accordingly.

As another aspect of the invention, the terminal 306 might also limit the user or display of certain transaction types, such as based upon the known or determined capabilities of the card 307. For example, a card 307 might identify multiple AIDs, but the terminal 306 may determine that some or all of those are not supported (such as based upon the capabilities of the card) and thus may either not use (such as when transaction types are selected automatically) or display or allow selection of (such as when the account-holder is provided with a list) those transaction types.

Dual Transaction Alternative Embodiment

In an alternative embodiment, after a card 307 is inserted and queried/authenticated, a query transaction is sent from the terminal 306 to the bank 301 (or other financial institution), such as via processor 304, to retrieve a debit account daily limit amount which is available from the account(s) which is associated with the account-holder presented card 307.

Figure 2A:
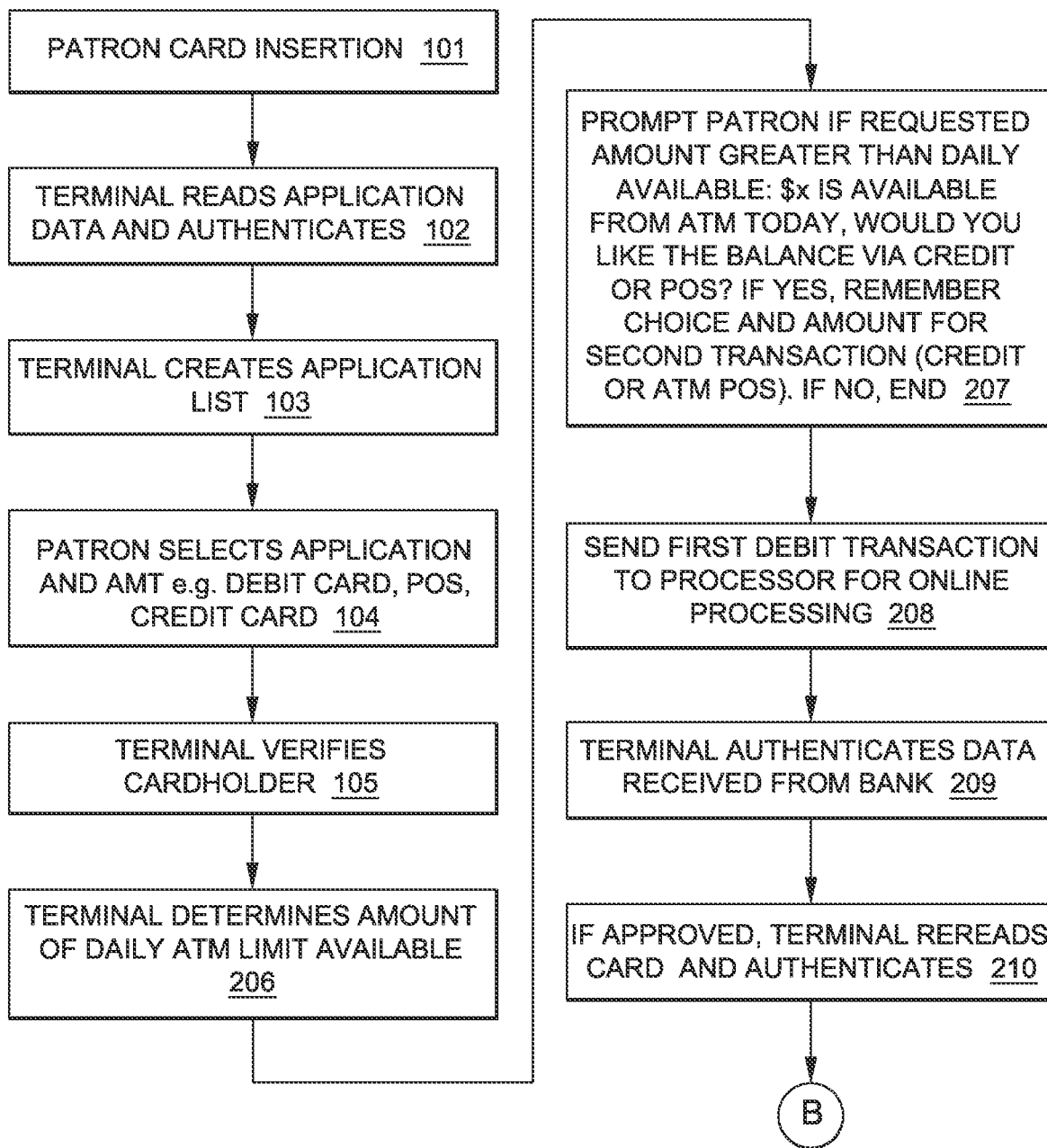
FIGS. 2A and 2B are flow diagrams illustrating a method in accordance with another embodiment of the invention.
Figure 2B:
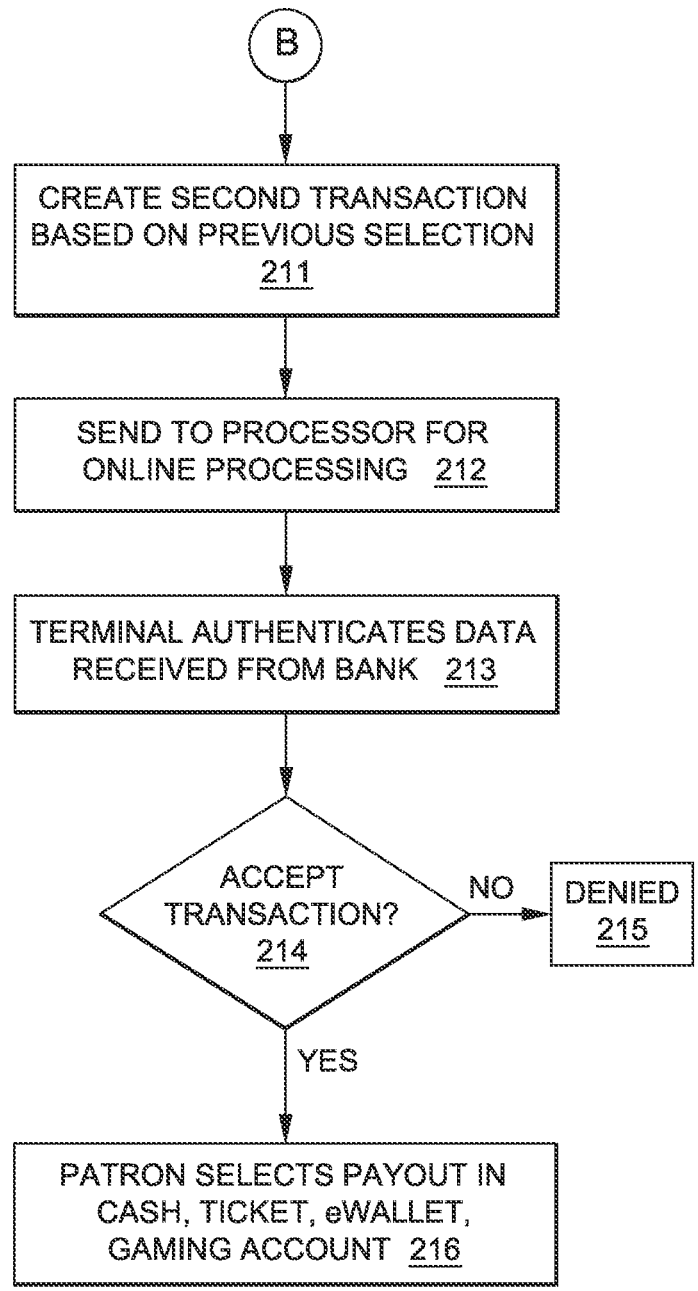

One embodiment of this process will be described with reference to FIGS. 2A and 2B. Step 100 through step 105 are as previously described.

In step 206 a debit account daily amount available transaction query is sent from the terminal 306 to the bank 301, such as after an account-holder requests a desired transaction amount. The bank 301 then responds to the processor 304 and the processor responds back to the terminal 306 to provide the debit daily limit amount that is available. In step 207, the daily limit or other accessible amount is checked against the amount requested by the account-holder. If the amount requested is more than the amount available, the terminal 306 prompts the account-holder with an option to split the request into two or more different transactions based upon different transaction types. As one example, the transaction might be split into: 1) a PIN-based transaction for the amount available and a 2) signature-based transaction wherein a signature is required (such as via the terminal or at a secondary location such as a casino cage) for the additional or remaining amount which was requested.

In step 208, the first transaction (such as the PIN-based transaction) is sent from the terminal 306 to the processor 304 for online processing.

In step 209, the bank 301 returns a response to the terminal 306 via the processor. If the PIN-based transaction is approved, the terminal 306 logs the amount approved, then in step 210, the terminal 306 rereads the card 307 and authenticates. In step 211, the terminal 306 prepares a second transaction.

The second transaction is sent to the processor 304 for online processing in step 212. A response is then received and authenticated by the terminal 306 in step 213 and a decision is made in step 214. If the second transaction is denied, the account-holder is notified that amount requested exceeds the daily debit amount limit and the secondary POS transaction has been denied. The terminal 306 then dispenses the amount available from the transaction.

If the second transaction is approved, step 216 the terminal 306 prompts the account-holder with a list of option regarding how funds may be delivered. This may include cash, a casino ticket, funds transfer to e-wallet, funds transfer to a gaming account, etc.

While aspects of the invention have been described with reference to the perspective of the account-holder or system operator, it will be appreciated that the invention corresponds to both entities. For example, while the invention includes the step of an account-holder presenting a card at a terminal, the invention correspondingly includes the step of the terminal operator "receiving" the card via presentation of the card at the terminal.

While certain transaction types and associated financial processing systems have been described herein, it will be appreciated that the transactions might be referred to by other terminology (for example, an "ATM" transaction is often used to referred to as a PIN-based transaction due to the fact that automated teller machines are frequently used to process PIN-based transactions; other transactions are often referred to as POS, debit, or credit transactions or the like and the invention may apply to any such transaction). Further, the invention may apply to other types of applications or transaction types now known or later developed. Further, while the invention has particular utility to an IC card, aspects of the invention may be applied to other cards or media having similar characteristics.

As indicated herein, in one embodiment of the invention, AIDs are determined from the card and the player may be presented with a menu of different available transaction types and may select from those transaction types (either in the initial processing of a request for funds or in a subsequent attempt). In another embodiment, the AIDs might be determined and then the terminal or system might automatically select or present the transaction processing type. For example, upon determining that the card supports both chip-and-pin and chip-and-signature type transactions, the terminal might automatically initially select the chip-andpin transaction (wherein if the requested transaction cannot be processed via that type of transaction, the terminal might then present the chip-and-signature as an alternative).

In yet another embodiment of the method, the AIDs may not even been read or used. Instead, the terminal and/or system might be configured to automatically present and/or try particular transaction types (such as common transaction types or certain ones which the terminal is programmed to implement), without regard to a determination of whether the card supports that type of transaction. In that event, the method may be streamlined by automatically processing a requested transaction using a first transaction type (e.g. without the steps of determining available transaction types, presenting available transaction type options to the account-holder and receiving a selection thereof), a second transaction type, etc., even though in a few cases a transaction might be rejected because the selected transaction is not of the type supported by the card.

In an alternative embodiment, a particular IC card issued by a bank, credit union, casino or a corporation such as Everi Holdings, Inc., may further support a plurality of applications and transactions from more than one financial account located at different financial institutions, banks or credit unions whereby the identified options may include selection of a designated account and transaction type.

It will be appreciated that the steps of the methods described herein may be performed in other orders (for example, user authentication (such as the receiving of an account-holder's signature) might be performed before a transaction is processed or after it is approved. Further, methods of the invention might comprise other or additional steps.

The invention has numerous advantages. A particular advantage of the invention is the processing of a financial transaction using an IC card where multiple transaction attempts may be performed to complete the transaction without requiring the account-holder to remove and re-insert the card or re-initiate a completely new transaction. In particular, in accordance with the invention, a unique methodology is employed which allows a terminal to attempt to process a sequence of different financial transaction types in order to fulfill an account-holder's request to access funds, even in the face of the unique security configuration of an IC card. Importantly, the terminal is configured to automatically present and prompt an account-holder with additional options for fulfilling a financial transaction request even when an initial transaction failed.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An improved financial terminal that automatically reconfigures into different financial processing terminal types comprising:
   a housing;
   a card reader configured to read information associated with a card linked to a financial account;
   at least one display;
   at least one processor;
   at least one memory, said memory embodying first non-transitory machine-readable code, said first non-transitory machine-readable code comprising a first kernel which, when executed by said at least one processor, causes said processor to configure said improved financial terminal into a first configuration for processing financial transactions of a first transaction type but not a second transaction type, and a second kernel which, when executed by said at least one processor, causes said improved financial terminal to be configured into a second configuration for processing financial transactions of a second transaction type but not said first transaction type; and
   said at least one memory embodying second non-transitory machine-readable code, said second machine-readable code, when executed by said at least one processor, causing said at least one processor of said improved financial processing terminal to:
      receive input of a requested financial transaction associated with said card read by said card reader;
      receive input of a transaction type for said requested financial transaction;
      execute said first kernel to cause said improved financial terminal to be configured into said first configuration when said transaction type comprises said first transaction type;
      process said requested financial transaction solely based upon said first transaction type;
      when said requested financial transaction is denied, automatically reconfigure said improved financial terminal by executing said second kernel cause said improved financial terminal to be configured into said second configuration; and
      process said requested financial transaction solely based upon said second transaction type.

2. The improved financial terminal in accordance with claim 1, wherein said second machine-readable code is configured to cause said processor to receive input of said transaction type by identifying information read from said card by said card reader and determining said first transaction type based upon identified available financial transaction types based on said information read from said card.

3. The improved financial terminal in accordance with claim 2, wherein said available financial transaction types are determined by reading application identifiers from said card.

4. The improved financial terminal in accordance with claim 3, wherein when said available financial transaction types includes at least one global transaction type, said second machine-readable code is configured to cause said at least one processor to select one of said global transaction types as said first transaction type.

5. The improved financial terminal in accordance with claim 1, wherein said second machine-readable code is configured to cause said processor to receive input of said transaction type via input by a user of said improved financial terminal.

6. The improved financial terminal in accordance with claim 5, wherein input of said transaction type comprises input of said requested financial transaction to be processed as a Personal Identification Number ("PIN") based transaction or a signature based transaction.

7. The improved financial terminal in accordance with claim 5, wherein said input comprises selection of said transaction type from a list of available transaction types.

8. The improved financial terminal in accordance with claim 7, wherein said second machine-readable code is configured to cause said at least one processor to receive input from said user of said second transaction type, said second transaction type selected from a second list of available transaction types, which said second list does not include said first transaction type.

9. The improved financial terminal in accordance with claim 1, wherein said improved financial terminal comprises at least one of a kiosk, an ATM and a POS terminal.

10. The improved financial terminal in accordance with claim 1, wherein said card reader is configured to read information associated with an integrated circuit of said card.

11. The improved financial terminal in accordance with claim 10, further comprising accepting at least a portion of said card into said card reader, engaging said integrated circuit of said card with said reader, and wherein said card is not disengaged by said card reader when said first financial transaction is denied.

12. The improved financial terminal in accordance with claim 11, wherein said card is automatically re-read by said card reader after said first financial transaction is denied.

13. The improved financial terminal in accordance with claim 1, further comprising a communication interface configured to transmit information to and receive information from at least network.

14. The improved financial terminal in accordance with claim 13, wherein said second machine-readable code is configured to cause said at least one processor to send, via said communication interface, a request to process said requested financial transaction as a transaction of said first transaction type.

15. The improved financial terminal in accordance with claim 13, wherein said second machine-readable code is further configured to cause said at least one processor to send to a first financial processing network, via said communication interface, a request to process said requested financial transaction as a transaction of said first transaction type, wherein when said processing of said requested financial transaction via said first financial transaction type is denied, automatically re-read said card while said card remains accepted into said card reader and send to a second financial processing network, via said communication interface, a request to process said requested financial transaction as a transaction of said second transaction type.

16. The improved financial terminal in accordance with claim 13, wherein said at least one network comprises a payment processing network and a banking network, wherein when said improved financial terminal is configured to process financial transactions of said first transaction type, said processor communicates with one of said payment processing network and banking network, and when said improved financial terminal is configured to process financial transaction of said second transaction type, said processor communicates with the other of said payment processing network and banking network.

17. The improved financial terminal in accordance with claim 1, further comprising a monetary dispensing device.

18. The improved financial terminal in accordance with claim 1, further wherein said second machine-readable code is further configured to cause said at least one processor to cause a monetary dispensing device to dispense an amount of funds when said first or second financial transaction is approved.

* * * * *